United States Patent Office 3,773,815
Patented Nov. 20, 1973

3,773,815
ANTIWEAR AND ANTIWELDING ADDITIVES FOR LUBRICANTS AND COMPOSITIONS THEREOF
Enzo Rossi, San Donato Milanese, Guido Giusti, Milan, and Luigi Imparato, Rome, Italy, assignors to Snam Progetti S.p.A., Milan, Italy
No Drawing. Continuation of abandoned application Ser. No. 773,347, Nov. 4, 1968. This application July 29, 1971, Ser. No. 167,436
Int. Cl. C07f 7/24, 15/04
U.S. Cl. 260—435
5 Claims

ABSTRACT OF THE DISCLOSURE

Lubricant additive compounds are disclosed having the formula:

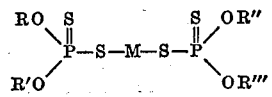

wherein each of said R, R', R" and R'" groups is an alkyl group containing from 2 to 20 carbon atoms, at least one of them containing a —CCl$_3$ group and M is calcium, barium, copper, lead, nickel, cobalt, silver, antimony or tin. Their preparation is also described.

---

This application is a continuation of application No. 773,347 filed Nov. 4, 1968, now abondoned.

This invention relates to compounds suitable for use as additives capable of giving lubricants anti-wear and/or anti-welding properties, to lubricating oils containing the additives, and to a process for preparing the additives.

It is known that the additives used for these purposes are organic derivatives of phosphorus, sulphur and chlorine. The use of mixtures of such derivatives has been proposed and it was found that it was necessary to employ the mixture in concentrations of 5 to 10%, based on the weight of the mineral oil. The need for such high concentrations of additive is due to the fact that often the properties of one derivative have a detrimental effect upon the other derivatives. When the surface which has to be protected by the additives is a metal one, due to adsorption phenomena, it is covered by a layer of the additive having the higher polarity therefor, and consequently the remaining additives which are further from the metallic surface are greatly reduced in effectiveness.

It is therefore an object of the present invention to provide a compound suitable for use as an additive for lubricating oils, which possesses the characteristics of the mixtures of the phosphorated, sulphurated and chlorinated compounds without having the detrimental inter-reactions of the known mixtures and which can be used in a lower concentration in the lubricating oil. The additive should impart to a lubricating oil at least one of the following anti-wear, anti-welding and anti-oxidant characteristics.

According to the present invention, there is provided a compound having the following general formula:

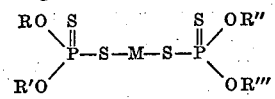

wherein each of R, R', R" and R'", which may be the same or different, is a substituted or unsubstituted hydrocarbon group having from 2 to 20 carbon atoms, and at least one of R, R', R" and R'" contains a —CCl$_3$ group; and M is a calcium, barium, zinc, cadmium, copper, lead, nickel, cobalt, silver, antimony or tin atom.

The compounds of the invention can be prepared by reacting phosphorus sulphide with an alcohol containing from 2 to 20 carbon atoms and a —CCl$_3$ group or with a mixture of said alcohol and one or more other alcohols which may be substituted or unsubstituted and which contain from 2 to 20 carbon atoms; and treating the resulting dithiophosphate with an oxide or salt of calcium, barium, zinc, cadmium, copper, lead, nickel, cobalt, silver, antimony or tin so as to obtain the desired compound.

Generally, the groups R, R', R" and R'" will be alkyl groups, more usually acylic alkyl groups.

Preferably, the salt employed in the production according to the invention of the compounds of the invention is an acetate, and the reaction is effected at an elevated temperature.

Sometimes it is advantageous to carry out the reaction in an inert solvent, for example xylene, but then it will generally be necessary to remove the inert solvent prior to adding the additive to a lubricant to form a lubricating composition according to the invention.

The invention will now be illustrated by the following examples.

EXAMPLE 1

0.4 mole of trichloroethanol was added to 0.1 mole P$_2$S$_5$ in a reactor, and the resulting mass was stirred, gradually heated up to 150° C. over the course of 30 minutes and maintained at that temperature until all the P$_2$S$_5$ had disappeared. The mixture was cooled down to between 80 and 90° C. and hydrogen sulphide was eliminated by blowing an inert gas through the mixture. Then 0.1 mole of anhydrous zinc acetate was introduced into the reactor and the resulting acetic acid was removed, for example by blowing an inert gas through the reactor or reducing the pressure in the reactor and suctioning off the acetic acid. The salification was completed within about 2 hours. The resulting mixture was then diluted with an organic solvent, in this case benzene, filtered and then the solvent was evaporated. Bis(trichloroethyl) zinc dithiophosphate was obtained as a viscous liquid (which solidifies during storage) in a yield of 86%. The product was crystallized from benzene as white crystals which had a melting point of 207° C. The crystals were analyzed as follows:

Calcd. (percent): P, 7.29; Cl, 50.08; Zn, 7.70; S, 15.10.
Found (percent): P, 6.9; Cl, 48.6; Zn, 7.70; S, 14.9.

The reaction described above may be carried out in a high boiling inert solvent, for example xylene, making, if desired, slight variations which are well known to persons skilled in the art, in the preparation of the product, for example the acid salification may be performed using zinc oxide instead of zinc acetate.

EXAMPLE 2

Employing a process similar to that described in Example 1, a dithiophosphoric acid was prepared by reacting 0.2 mole trichloroethanol and 0.2 mole 2-ethylhexanol with 0.1 mole P$_2$S$_5$. When the resulting mixture was neutralized with anhydrous zinc acetate, zinc dithiophosphate, in the form of a viscous yellow-brown liquid was produced in a yield of 90%.

Analysis gave the following values.—Calcd. (percent): P, 7.64; Cl, 26.22; Zn, 8.06; S, 15.82. Found (percent): P, 7.9; Cl, 24.8; Zn, 8.2; S, 15.1.

EXAMPLE 3

Employing a process similar to that described in Example 1, a dithiophosphoric acid was prepared by reacting 0.1 mole trichloroethanol and 0.3 mole 2-ethylhexanol with 0.1 mole P$_2$S$_5$. Salification with anhydrous zinc acetate produced a zinc dithiophosphate, in the form of a viscous yellow liquid, in a yield of from 92 to 93%.

Analysis gave the following values.—Calcd. (percent): P, 7.82; Cl, 13.42; Zn, 8.25; S, 16.20. Found (percent): P, 7.8; Cl, 12.9; Zn, 8.2; S, 15.7.

EXAMPLE 4

Employing a process similar to that described in Example 1, a dithiophosphoric acid was prepared by reacting 0.2 mole trichloroethanol and 0.2 mole isodecanol with 0.1 mole $P_2S_5$. Upon salifying with anhydrous zinc acetate a liquid, very viscous, brown coloured zinc dithiophosphate was produced in a yield of 90%.

Analysis of the product gave the following values.—Calcd. (percent): P, 7.14; Cl, 24.52; Zn, 7.54; S, 14.79. Found (percent): P, 7.1; Cl, 23.5; Zn, 7.5; S, 14.5.

EXAMPLE 5

Employing a process similar to that described in Example 1, a dithiophosphoric acid was prepared by reacting 0.1 mole trichloroethanol and 0.3 mole 4-methyl-2-pentanol with 0.1 mole $P_2S_5$. Upon salification with nickel acetate, a liquid, viscous, brown coloured nickel dithiophosphate was produced in a yield of 91%.

Analysis of the product gave the following values.—Calcd. (percent): P, 8.84; Cl, 15.17; Ni, 8.38; S, 18.30. Found (percent): P, 9.0; Cl, 13.9; Ni, 8.4; S, 17.8.

EXAMPLE 6

Employing a process similar to that described in Example 1, a dithiophosphoric acid was prepared by reacting 0.1 mole trichloroethanol and 0.3 mole 4-methyl-2-pentanol to react with 0.1 mole $P_2S_5$. Upon neutralization with lead acetate, a solid waxy lead dithiophosphate was produced in a yield of 94%.

Analysis of the product gave the following values.—Calcd. (percent): P, 7.29; Cl, 12.51; Pb, 24.39; S, 15.10. Found (percent): P, 7.3; Cl, 12.1; Pb, 25.2; S, 14.6.

The additives were subjected to the following tests in order to study their behaviour under oxidation, corrosion and wear.

(a) Oxidation test

In the following Table 1 are listed the results found with the Staeger oxidation test on a paraffinic mineral SAE 30 oil with a high viscosity Index, to which has been added the products of the foregoing examples, a commercial grade zinc dialkyldithiophosphate, product (A), bis-(4-methyl-2-pentyl)-zinc dithiophosphate and bis-(2-ethylhexyl)-zinc dithiophosphate.

The test consisted in heating the oil to be tested at 110° C. in a thermostatic stove. In the oil was immersed a copper strip acting as an oxidation catalyst, which was inspected at regular intervals to determine the variation in the neutralization number. The test was considered ended when the increment of the neutralization number was 0.25.

TABLE 1

| Additive | Conc. percent (weight) | Initial neutralization number (mg. KOH/g.) | Hours necessary to obtain an increment of 0.25 of the neutralization number |
|---|---|---|---|
| None | | 0.02 | 340 |
| Product of Example: | | | |
| 1 | 44.10⁻⁴ | 0.09 | 770 |
| 2 | 44.10⁻⁴ | 0.09 | 705 |
| 3 | 44.10⁻⁴ | 0.09 | 740 |
| 4 | 44.10⁻⁴ | 0.09 | 910 |
| A | 44.10⁻⁴ | 0.09 | 850 |
| Bis(4-methyl-2-pentyl)zinc dithiophosphate | 44.10⁻⁴ | 0.09 | 1,170 |
| Bis(2-ethylhexyl)zinc dithiophosphate | 44.10⁻⁴ | 0.09 | 765 |

(b) Corrosion test (b–1) ASTM D 665 Test: The test in question was carried out by stirring a mixture of 300 ml. of the oil to be tested and 30 ml. of distilled water, maintained at a temperature of 60° C., with a cylindrical steel test piece, for 24 hours. The results are reported in the following Table 2.

TABLE 2

| Additives | Mineral oil | Conc. percent weight | Result |
|---|---|---|---|
| Product of example: | | | |
| 1 | SAE 90 | 1 | Satisfactory. |
| 2 | SAE 90 | 2.2 | Do. |
| 3 | SAE 90 | 3.8 | Do. |
| 4 | SAE 90 | 2.5 | Do. |

(b–2) Corrosio ntest MIL 2105 B: This test consisted in heating the oil to be tested and a copper strip immersed in the oil in a thermostatic stove at 121° C. for 3 hours.

To be satisfactory, at the end of the test the copper strips must have an ASTM D 130 coloration lower than that of a similar strip suspended in another part of the stove. The results are shown in the following Table 3.

TABLE 3

| Additives | Mineral oil | Conc. percent weight | ASTM D 130 of the comparison copper strip | Copper strip immersed in oil |
|---|---|---|---|---|
| Product of Example: | | | | |
| 1 | SAE 90 | 1 | 2A | 1A |
| 2 | SAE 90 | 2.2 | 2A | 1A–1B |
| 3 | SAE 90 | 3.8 | 2A | 1A |
| 4 | SAE 90 | 2.5 | 2A | 1A |

(c) Wea rtest: Wear was tested with a "Shell four ball tester," a well known apparatus by means of which lubricants are evaluated by measuring the wear caused on 3 steel stationary balls when a fourth upper steel ball is rotated on them at high speed, the lubricant being injected between the balls. The load applied through this fourth ball was increased continuously. By means of this apparatus, it is possible to determine the critical load function of the lubricant, which is the point at which the wear suddenly increases beyond the value which can be predicted by means of the Hertz theory on plastic deformation. The wear is calculated from the increase in the scar diameter formed on the surfaces of the stationary balls. The critical load can be defined as the load which causes seizure after a specific time, in the present case 1 minute.

When loads higher than the seizure load were employed, considerable variations occurred in the wear scar diameter on the three stationary balls which, after a certain time, became welded to each other, thereby determining the end of the test. This last load is referred to as the welding load.

Seizure loads, wear scar diameters and welding loads are considerably affected by the chemical additives present in oil. Generally, the lower the wear diameters, the better the additives for equal conditions.

In the following Table IV are shown values of the seizure and welding loads and a middle load between the two preceding ones, found with the "Shell four ball apparatus" for an oil with the additives of the present invention and comparative additives, namely a mixture of zinc dithiophosphate and a chlorinated commercial grade additive for gear boxes and differential gears (B, C and D) containing phosphorus, chlorine and sulphur in different proportions. The oil used in the test was the same for all the additives and was SAE 90 grade.

TABLE IV

| Additives | Conc. percent weight | Seizure load, kg. | Welding load, kg. | Wear $\phi$ at a load of 200 kg./mm. |
|---|---|---|---|---|
| Ex. 1 | 1 | 150 | 550 | 1.10 |
| Ex. 2 | 2.2 | 135 | 440 | 1.35 |
| Ex. 3 | 3.8 | 105 | 430 | 1.20 |
| Ex. 4 | 2.5 | 120 | 410 | 1.40 |
| A | 1 | 100 | 330 | 2.25 |
| B | 6.5 | 115 | 400 | 1.35 |
| C | 6.5 | 130 | 380 | 1.65 |
| D | 10 | 130 | 430 | 1.30 |

The results shown in Table IV indicate the improvement in performance of oils to which have been added a product of the present invention, since with an equal content of chlorine they give welding load values higher and wear diameters lower than those of a mixture of zinc dialkyldithiophosphate and chlorinated paraffin, compare the products of Examples 1, 2, 3 and 4 with the formulation A. In addition, when employed at a lower concentration by weight than the commercial additives B, C and D they give similar seizure and welding load values and similar or lower wear diameters, compare the products of Examples 1, 2, 3 and 4 with formulations B, C and D.

What is claimed is:

1. A compound having the formula:

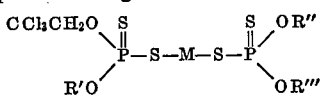

wherein each of R', R" and R'" is alkyl having from 2 to 20 carbon atoms and M is a lead or nickel atom.

2. A compound as claimed in claim 1 wherein each of said R', R" and R'" groups is 4-methyl-2-pentyl.

3. A compound as claimed in claim 2 wherein M is nickel.

4. A compound as claimed in claim 2 wherein M is lead.

5. A compound having the formula:

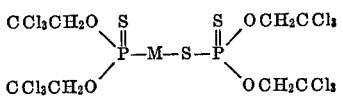

wherein M is a lead or nickel atom.

References Cited

UNITED STATES PATENTS

| | | | |
|---|---|---|---|
| 2,552,570 | 5/1951 | McNab et al. | 252—32.7 E |
| 2,708,204 | 5/1955 | Bell et al. | 260—439 R |
| 2,884,431 | 4/1959 | Smith et al. | 260—429.9 |
| 2,932,614 | 4/1960 | Lynch et al. | 260—435 R |
| 2,959,544 | 11/1960 | Smith et al. | 260—429.9 |
| 3,014,940 | 12/1961 | Lynch et al. | 260—435 R |
| 3,087,950 | 4/1963 | Burnop | 260—429 R |
| 3,234,250 | 8/1966 | Schneider et al. | 260—435 R |
| 3,290,347 | 12/1966 | Miller | 260—435 R |

DANIEL E. WYMAN, Primary Examiner

A. P. DEMERS, Assistant Examiner

U.S. Cl. X.R.

252—32.7; 260—429 K, 429.7, 429.9, 430, 438.1, 439 R, 446, 920